United States Patent [19]

Pusateri et al.

[11] Patent Number: 4,654,077
[45] Date of Patent: Mar. 31, 1987

[54] METHOD FOR THE PYROMETALLURGICAL TREATMENT OF FINELY DIVIDED MATERIALS

[75] Inventors: John F. Pusateri, Beaver, Pa.; Thomas E. Kidd, Tullahoma; Glen R. Lazalier, Hillsboro, both of Tenn.

[73] Assignee: St. Joe Minerals Corporation, Monaca, Pa.

[21] Appl. No.: 799,538

[22] Filed: Nov. 19, 1985

[51] Int. Cl.$^4$ .................................................. C22B 5/02
[52] U.S. Cl. ........................................... 75/92; 75/32; 266/200
[58] Field of Search ................ 75/32, 26, 92; 266/200

[56] References Cited

U.S. PATENT DOCUMENTS

| | | | |
|---|---|---|---|
| 2,894,831 | 7/1959 | Old ........................................ | 75/26 |
| 3,271,134 | 9/1966 | Derham ................................. | 75/87 |
| 3,607,224 | 9/1971 | Blaskowski ........................... | 75/26 |
| 3,915,692 | 10/1975 | Herbert et al. ...................... | 75/23 |
| 4,362,561 | 12/1982 | Weigel et al. ....................... | 75/92 |

OTHER PUBLICATIONS

Bryk et al. "Flash Smelting of Lead Concentrates", *J. of Metals*, Dec. 1966, 1298–1302.
Melcher et al. "The KIVCET Cyclone Smelting Process For Impure Copper Concentrates", *J. of Metals*, Jul. 1976, 4–8.
Elvander et al. "The BOLIDEN INRED Process For Smelting Reduction of Fine-Grained Iron Oxides and Concentrates", *Third Iron & Steel Cong. Proc.* Apr. 1978, Chicago, IL, 195–200.
Bengtsson et al. "The Chemistry of the ELRED Process", *I&SM*, Oct. 1981, 30–34.
Chaudhurl et al. "Comparative View On The Metallurgy of the KIVCET-CS and Other Direct Lead Smelting Processes", *CIM Bulletin*, Nov. 1978, 126–130.

*Primary Examiner*—Peter D. Rosenberg
*Attorney, Agent, or Firm*—Robert D. Yeager

[57] ABSTRACT

Process and apparatus for pyrometallurgically treating finely divided ores, concentrates, residues, slags and like materials. The process utilizes a reactor having two co-axially extending, vertical reaction chambers. The process comprises forming within the upper chamber of the reactor hot fuel-rich reaction gases; passing the hot fuel-rich reaction gases by dump flow into a second vertically extending chamber; introducing into the second chamber the finely divided materials to be treated; and reacting the finely divided materials with the hot fuel-rich reaction gases. The dump flow of hot fuel-rich reaction gases passing into the second chamber is produced by providing a zone of sudden expansion in the flow passage between the first and second chambers.

11 Claims, 4 Drawing Figures

METHOD FOR THE PYROMETALLURGICAL TREATMENT OF FINELY DIVIDED MATERIALS

BACKGROUND OF THE INVENTION

1. Field of the Invention

This invention relates to the pyrometallurgical treatment of finely divided ores, concentrates, residues, mattes, slags, and like materials, more particularly to methods and apparatus for use in such treatment.

2. Description of the Prior Art

The extraction of elemental metals from the materials in which they occur, both, for example, naturally in the form of ores and man-made in the forms of slags and residues, is undergoing dramatic change brought on by the ever-increasing cost of energy and a heightened concern for the environment. The chemistry of such extraction processes is old and well-known; basically, the problem is to separate the elemental metal from other chemical elements or compounds with which it is bound such as, for example, oxygen (oxides) and sulfur (sulfides). The traditional solution has been to apply energy in whatever form and amount are needed to effect the extraction and without much regard to the nature of the by-products produced in such extraction processes or their impact on the environment. This approach can no longer be tolerated from an economic, environmental or legal standpoint. The new emphasis in metal extraction processes thus centers around capital minimization, energy efficiency, product yield, and by-product recovery, and specifically including solid, molten, and gaseous by-products and effluent control.

A notable example of the foregoing problem is in the production of zinc. Zinc in the elemental state is not known to occur in nature and, therefore, it must be extracted from zinciferous materials by selected processes. Those processes that have been or are presently being used commercially may be classified as (a) horizontal retort, (b) vertical retort, (c) electrothermic, (d) blast furnace, and (e) electrolytic.

In general, the thermal processes, namely, (a) through (d) above, are based on the principle of carbothermic reduction for extracting zinc from zinc-bearing materials. Carbon monoxide gas (CO) or solid carbon is the primary reducing agent in these processes, but zinc oxide can be reduced to zinc metal only at temperatures usually well above the boiling point of elemental zinc which is 907° C. (1664.6° F.). Large amounts of energy are expended in achieving and maintaining such temperatures.

The traditional thermal processes suffer from several shortcomings including the need to prepare a hard, agglomerated feed to withstand furnacing; slow reaction rates, requiring long residence times usually in one very large or numerous small reactor unit(s); the use of large quantities and expensive forms of energy such as lump coke, charcoal, electricity, and natural gas, in some cases due to indirect heating of the charge; and high capital and operating costs per unit of product, thereby requiring relatively large plant capacities to be economical. Likewise, the electrolytic process, while more technically advanced than most of the thermal processes, still suffers from high capital, energy and operating costs.

In recent years, a number of efforts have been focused worldwide on overcoming some of the inherent shortfalls of traditional thermal smelting. These efforts have resulted in several methods of recovering metal values from finely divided ores, concentrates, calcines, and slags by flash smelting in reactor-type vessels. Flash smelting does not require preagglomeration of metal-bearing feeds; has a high volumetric rate of throughput (or short residence time); can use cheaper forms of thermal energy such as fine coke, coal, charcoal and waste carbon, and/or sulfide fuel; can be easily automated; and often can be oxygen-blown, decreasing the off-gas handling volume and problems. This method therefore generally has better energy utilization and lower operating costs than the traditional methods. Furthermore such reactors generally have lower capital requirements and the size of the unit can be much smaller than traditional furnace installations of like capacity.

As examples of the just-mentioned process, see Derham U.S. Pat. No. 3,271,134 (zinc calcine); Blaskowki U.S. Pat. No. 3,607,224 (iron ore); "Flash Smelting of Lead Concentrates," Bryk et al., *J. of Metals*, Dec. 1966, 1298-1302; "The KIVCET Cyclone Smelting Process for Impure Copper Concentrates," Melcher et al., *J. of Metals*, July 1976, 4–8; "The Boliden INRED Process for Smelting Reduction of Fine-Grained Iron Oxides and Concentrates," Elvander et al., *Third Int. Iron & Steel Cong. Proc.*, April 1978, Chicago, IL, 195-200; and "The Chemistry of the ELRED Process" (iron ore), Bengtsson et al., *I & SM*, Oct. 1961, 30–34. These processes have met with varying degrees of success, but all are believed to have limitations brought about by (a) the complexity and expense of the associated equipment needed to practice them, (b) an inability to process a variety of feed materials, and/or (c) difficulty in controlling and stabilizing process parameters. Some of the processes have never operated commercially. In general, most commercial flash smelting units are limited to one-step oxidation of sulfidic feeds, while other processes for oxide feeds involve more than one step or reactor.

The invention presented here addresses some of the inherent shortfalls of current flash-smelting technology.

SUMMARY OF THE INVENTION

The present invention meets the present-day demand for energy efficiency and environmental control by providing a pyrometallurgical treatment process for extracting metal values from ores and other complexes in a single reactor having multiple stages. The invention further provides more complete reaction of the constituents and produces more desirable products at lower per-unit energy costs than heretofore possible.

The present invention thus overcomes shortcomings associated with prior art suspension-type flash smelting reactor processes by permitting greater control over operations within the reactor, more efficient utilization of fuel, and more desirable end products from the standpoints of both composition and yield; furthermore the reactor of the present invention is of more compact size and relatively simple construction and thus is less expensive than known reactors.

In broad terms, the process of the present invention comprises the steps of: providing within a first vertically extending chamber hot fuel-rich reaction gases; passing the hot gases by dump flow into a second vertically-extending chamber; introducing into the second chamber the finely divided materials to be treated; and reacting the finely divided materials with the hot fuel-rich reaction gases. Preferably, the hot fuel-rich reaction gases are provided by forming within the first chamber a reaction mixture of a fuel-containing substance, such as fine coal or coke, and an oxidizing substance such as oxygen, air or oxygen-enriched air and substantially reacting the mixture within the first chamber under fuel-rich conditions.

The process of the invention requires the establishment of a gas dynamically stable reaction zone in the first chamber and a gas dynamically stable reaction zone in the second chamber. In the first chamber, stabilization is achieved by a combined swirling action and a dumping action, the latter being thought of as the creation of a "ring vortex" stabilized flow brought about by sudden expansion of the reaction mixture as it moves downwardly through a rapidly increased flow passage area. In this sense, the first chamber of the process reactor may, in practice, be subdivided into two chambers, the lowermost of which has a flow passage area greater than the passage above in which the reactant mixing action takes place. A dumping action then occurs as the reaction mixture passes into the larger flow passage. A second gas dynamically stable reaction zone is produced in the second chamber by passing the fuel-rich reaction mixture in dump flow downwardly into the second chamber, which has a flow passage area still larger than the passage above. In this description, the term "combustion" will be used to mean a chemical reaction between fuels and oxygen containing gas to produce solid, liquid, or gaseous products and heat.

The present invention further provides apparatus for carrying out the pyrometallurgical processes discussed above. The apparatus comprises a vertical reactor having first and second stages in series, the first stage having a reactant mixing and ignition section feeding a dump section, the output of the dump section feeding the second stage through another dump section; the second stage having an output for treated material; means coupled to the first stage for introducing therein a fuel-containing substance and an oxidizing substance to produce within the first stage a hot reactant mixture for subsequent reaction; and means coupled with the second stage for introducing therein material to be treated by reaction with the aforesaid hot reactant mixture to yield desired treated material that exits from the output of the second stage.

As can be seen, the process of the present invention can include treatment of materials under either chemically oxidizing or reducing atmospheres. For example, metal-bearing sulfidic feeds such as concentrates can be reacted in a generally oxidizing atmosphere to remove some or all of the sulfur and undesirable impurities, generate heat and produce upgraded molten or solid products such as mattes, slags or elemental metals which contain the valuable metals. Treatment of metal-bearing oxidic feeds such as slags, calcines, and residues can be performed in a generally reducing atmosphere. In this latter example, the carbon and hydrogen compounds found in carbonaceous fuels are partially oxidized to produce carbon monoxide and hydrogen as gaseous reductants in addition to $CO_2$, $H_2O$, heat and other minor compounds. The metal oxides contained in the feed material are then reduced to elemental metals in either vapor or molten form for subsequent recovery and separation from gangue and undesirable impurities to produce concentrated metal-mattes or elemental metals. Alternatively, elemental metal vapors maybe subsequently reacted with air or oxygen to produce concentrated metal oxides. The terms "oxidizing atmosphere" and "reducing atmosphere" are well known in the thermochemistry art. Control of the conditions within the reactor is an important consideration for proper operation of the invention and requires precise metering and proportioning of solid and gaseous feeds according to well-known thermochemical principles.

Details and advantages of the present invention will become apparent from the following detailed description of the present preferred embodiments, taken with reference to the accompanying drawings in which:

BRIEF DESCRIPTION OF THE DRAWINGS

The same reference numerals are used throughout the drawings to designate the same or similar parts.

DESCRIPTION OF THE PREFERRED EMBODIMENTS

Figure 1:
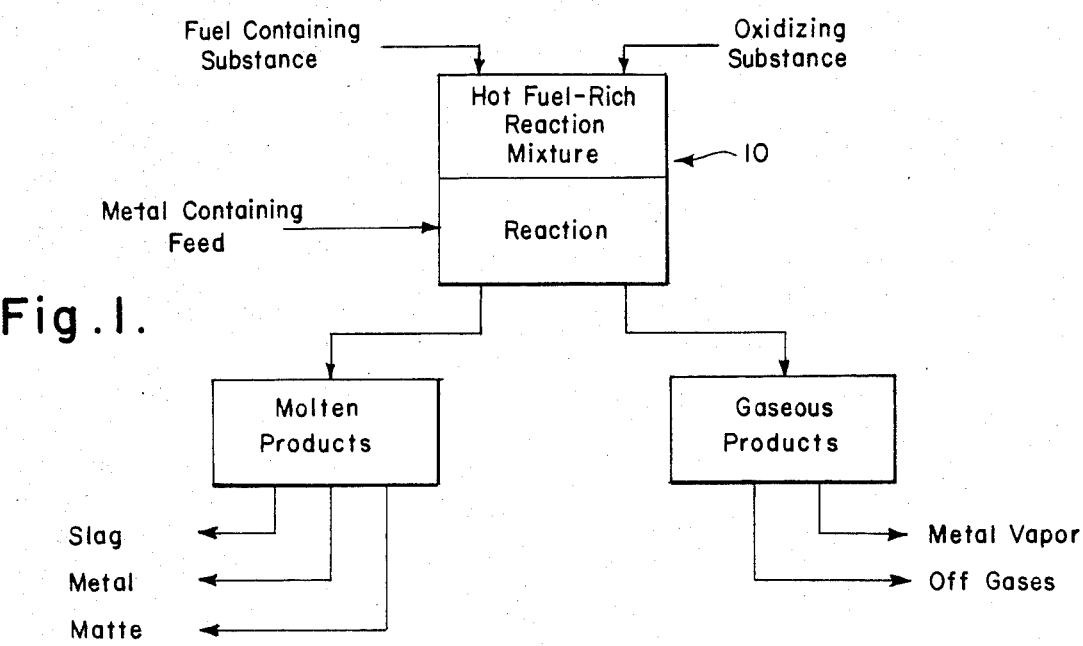
FIG. 1 is a generalized flow chart illustrating the steps in treating a metallurgical feed material, utilizing the process of the present invention, to produce molten and gaseous products.

Referring to FIG. 1, there is shown in general terms the treatment process employing the present invention. A source of fuel-containing substance and a source of oxidizing gas feed a vertically arranged two-stage reactor, generally designated by the reference numeral 10, at the top. Depending upon the nature of the metallurgical feed material to be treated in the process, the fuel-containing substance can be a solid carbonaceous material, such as fine coal or coke; a gaseous or liquid hydrocarbon, such as natural gas; or a sulfur-containing material, such as a metal sulfide ore or concentrate. The nature of the fuel-containing substance will depend upon the metallurgical treatment objectives as well as the reactor heat balance; likewise the oxidizing substance fed to reactor 10 may be pure oxygen, oxygen enriched air, ordinary air, or other equivalent oxidizing substance again depending upon the reducing or oxidizing conditions desired and the overall metallurgical objectives of the treatment process. The purpose of introducing the fuel-containing substance and the oxidizing substance is to controllably form and partially react this mixture in the upper stage of reactor 10 to produce a hot fuel-rich reaction mixture for further reaction with a metallurgical feed material in the lower stage of reactor 10.

The nature of the metallurgical feed material to be treated by the process of the present invention may vary widely. Examples of such materials are metal oxides and sulfides, and these materials may be in the form of finely divided ores, slags, residues, concentrates, and the like. A particular example of a material to be treated is furnace slag, (a by-product obtained in the smelting of metal oxide feeds) primarily containing zinc as recoverable metal will be discussed in detail hereinbelow.

In the lower stage of reactor 10, the metallurgical feed material in a finely divided state contacts the hot fuel-rich reaction mixture produced upstream to yield elemental metals in their standard states at reactor temperatures (e.g., vapor or liquid) together with molten slag, molten metal-containing products (such as mattes) and gaseous by-products.

The products of the reaction in the lower stage of reactor 10 are then recovered or treated by conventional, known methods; for example, they could be passed to a molten product separator where any liquid products such as molten metal, metal-matte and slag are separated from the gaseous products. The liquid products are then removed from the process for further separation into useable metal values and slag. The gaseous products of the reaction in the lower stage of reactor 10 could be passed to a unit operation, such as a condenser, for converting metal vapor into the liquid state and separating it from the remaining gas constituents. The reactor gas (less metal vapor) can then be recovered for reuse or treated to meet environmental standards for release to the atmosphere. The gaseous products could also be after-combusted with air or oxygen-enriched air to produce a relatively pure metal oxide product and recoverable by-product energy.

Feed System

By reference to FIG. 2, a system for feeding material to reactor 10 will now be described. Reactor 10 includes a first-stage or pilot section 12 consisting of an upper pilot section 14 mounted vertically and coaxially above a lower pilot section 16 which includes a gas injection section 18 and is disposed vertically and coaxially above a second stage 20 that includes a feed injection section 22 and a reactor section 24.

In terms of the process description provided earlier, upper pilot section 14, lower pilot section 16 and gas injection section 18 together comprise the first chamber or stage, while the feed injection section 22 and reactor section 24 together comprise the second chamber or stage.

To initiate operation of reactor 10, a preheat and ignition source is provided via igniter 29, where a hydrocarbon fuel in liquid or gaseous form, such as natural gas from source 28 is mixed with air, as from source 36, and ignited. The ignited gas passes through ignition tube 30 where it can be mixed and reacted with oxidizing gas flowing through pipe 33. The ignited gas then passes into upper pilot section 14, preheating this section and providing ignition source for the initial flow of fuel-containing substance. Once reaction of the fuel-containing substance is self-sustaining, operation of the igniter 29 is discontinued.

A fuel-containing substance is fed from hopper/feeder assembly 40 and into conduit 46. Depending upon its nature, the fuel containing substance may be entrained in a conveying gas such as air flowing in conduit 42. The fuel-containing substance is then fed downwardly into upper pilot section 14, where it contacts oxidizing gas flowing through pipe 33 in any suitable manner to impart intense turbulent mixing action upon the resultant fuel-oxidizing gas mixture, and to initiate fuel/oxidizing gas reactions.

The oxidizing gas in pipe 33 may be air from source 36 mixed as necessary with pure oxygen from oxygen source 52. Oxidizing gas may be fed into the gas injection section 18 via pipes 60 (A) in a manner to mix, react with, and stabilize the hot reactant mixture, and may be composed of air from source 36 mixed as necessary with pure oxygen from oxygen source 52. The oxidizing gas fed to the upper pilot section 14 through pipe 33 and to the gas injection section 18 through pipe 60 may be of similar or different compositions. Either one or both oxidizing gas streams may be preheated through conventional means.

Figure 2:
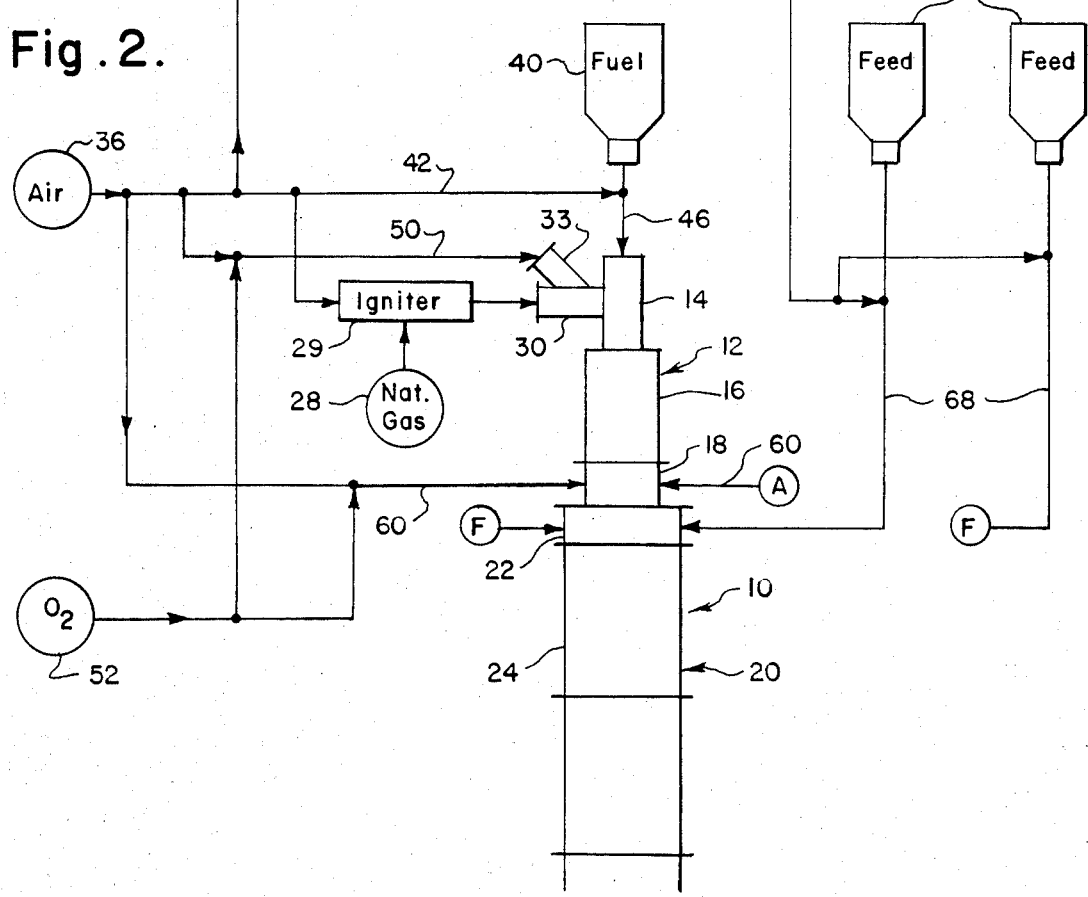
FIG. 2 is a process flow schematic illustrating the reactor of the present invention and showing the material feeds thereto.

The feed material (F) to be treated in reactor 10 is stored in one or more hopper(s) 66 and is then metered and fed to the feed injection section 22 through conduits 68 after being entrained in a conveying gas (air as shown in FIG. 2, although nitrogen or some other gas could be used). The exact manner of introducing the feed material into second stage 20 at feed injection section 22 will be described below. Flux materials or additional fuel-containing substance also may be added to the reactor feed through a feed system similar to that described above.

Reactor Construction

Figure 3:
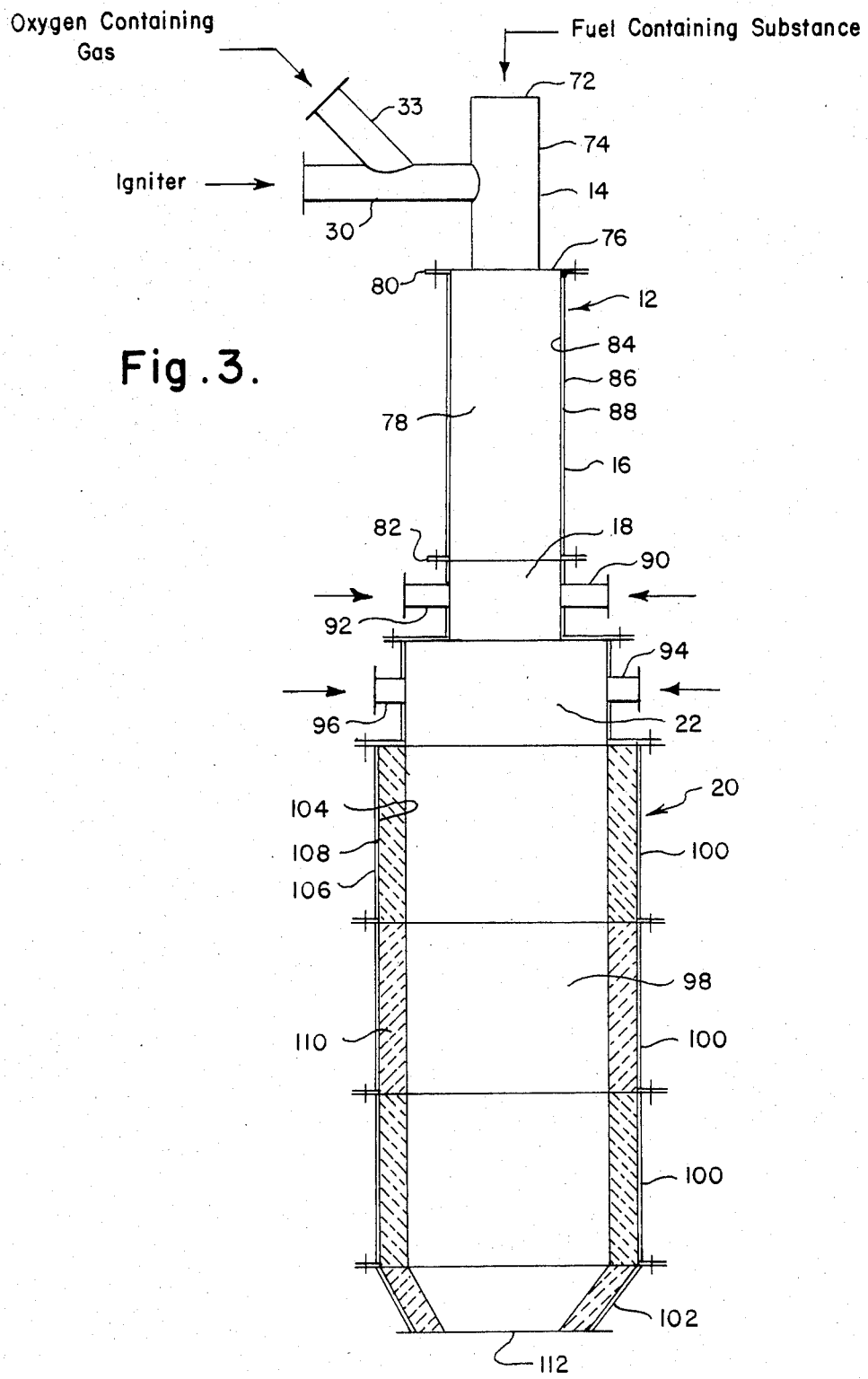
FIG. 3 is an elevational view, partly in section, of a reactor constructed in accordance with the present invention.

Before proceeding further with a discussion of the process of the present invention, it will be convenient to describe the details of construction of reactor 10 by reference to FIG. 3. In FIG. 3, the upper pilot section 14 of first-stage 12 is shown as consisting of a hollow cylindrical structure having top and side walls 72 and 74, respectively, and flange 76. These walls and flange may be constructed of a high temperature alloy such as Inconel 600 series material, a product of International Nickel Co., and may be externally cooled by means of an air spray or a cooling jacket. The upper pilot section 14 constitutes the mixing and ignition section of the first stage 12 of reactor 10. Persons skilled in the art will appreciate that the pipes for introducing the fuel containing substance and the oxidizing gas mixture into upper pilot section 14 may be variously positioned relative to each other to achieve the desired turbulent mixing action.

Immediately below and coaxially connected to upper pilot section 14 is lower pilot section 16 in the form of a hollow cylindrical structure having an internal diameter greater than the internal diameter of upper pilot section 14. This abrupt increase in diameter causes a "dumping" action to occur in the fuel/oxidizing gas mixture flowing downwardly in reactor 10 in a manner described below. Lower pilot section 16 has a main burner section 78 extending between flange lines 80 and 82 and formed by an inner wall 84 disposed concentrically within an outer wall 86 of larger diameter. Inner wall 84 may be constructed of series 300 stainless steel, while outer wall 86 may be either stainless or carbon steel. Suitable means such as piping or flow channels 88 are located between walls 84 and 86 for circulating a coolant such as water. An optional expansion bellows (not shown) of well-known construction may surround a portion of main burner section 78 to accommodate differential expansion and contraction of walls 84 and 86 according to well-known principles. The quantity of coolant passed through channels 88 and its cooling capacity should be adjusted in accordance with well-established criteria to allow the inner walls 84 to withstand temperatures within main burner section 78 as high as 2750° C. (5000° F.) without melting and to freeze a slag layer on the inner surface of wall 84.

Although shown in FIG. 3 as being separable from main burner section 78 along flange line 82, gas injection section 18 may be viewed merely as an extension of main burner section 78, collectively constituting lower pilot burner (or dump) section 16. Gas injection section 18 is of the same general construction as section 78, having an inner wall of series 300 stainless steel, an outer wall of stainless or carbon steel, and intermediate coolant conveying channels or piping.

As best shown in FIG. 3, two gas injection pipes 90 and 92 are, for example, diametrically opposed at the periphery of section 18. Pipes 90 and 92 are connected (by means not fully shown) to the oxidizing gas pipe 60 in the system shown in FIG. 2. Injection of oxidizing gas into section 18 radially inward through pipes 90 and 92 tends to increase the level Of turbulence in the gaseous discharge of lower pilot burner 16 at its outlet and to enhance reactivity of the streams in second stage 20 of reactor 10. Further, by acting as a gas dynamic restrictor to the flow from the pilot section 16, the radial injectors promote the confinement of combustion within first stage 12 of reactor 10. These effects may be gas dynamically described as "tripping" of the flow boundary layer and "pinching" of the bulk flow. This gas injection may also permit increased throughput without increasing the length of pilot burner 16, help the combustion system withstand reactor pressure fluctuations, and reduce the deleterious effects of such fluctuations on reaction stability.

The second stage 20 of reactor 10 is constructed somewhat similarly to the lower pilot section 16 of the first stage 12. That is, second stage 20 consists of a hollow cylindrical structure coaxially aligned with first stage 12 and having an internal diameter greater than the diameter of lower pilot burner section 16 above. Again, this abrupt increase in diameter causes a dumping action to occur in the reacting constituents flowing downwardly in reactor 10. The feed material to be treated is fed from storage bins 66 (see FIG. 2) to feed section 22 and is injected into second-stage 20 through two or more pipes 94 and 96 (best seen in FIG. 3). Feed section 22 is formed by inner and outer cylindrical walls, respectively, with coolant circulating elements disposed therebetween.

The remaining portion of second stage 20, reactor shaft 98, is formed by one or more similar hollow cylindrical sections 100 and an outlet section 102. Each section 100 of reactor shaft 98 consists of an inner wall 104, an outer concentrically disposed wall 106, and coolant circulating elements 108 disposed therebetween. Walls 104 and 106 preferably are constructed of series 300 stainless steel and carbon steel, respectively. An optional expansion bellows (not shown) may surround each section 100.

The interior surface of inner wall 104 of each section 100 must be sufficiently protected to withstand the effects of solid and molten particle-laden effluent gases at temperatures that may exceed 1750° C. (3200° F.). The arrangement for circulating coolant between walls 104 and 106 should be capable of extracting sufficient heat from the walls so as to preferably result in a thin protective frozen slag coating on the inside surface. One method for reactor construction involves the attachment of numerous high temperature alloy studs to the inner wall 104 to promote heat transfer to the cooling jacket, and to provide additional mechanical support for the frozen slag layer. Alternatively, the interior surface of inner wall 104 of each section 100 may be lined with high service temperature (>2000° C. (>3650° F.)) refractory 110, such as a high alumina, chromic oxide, phosphate-bonded plastic. Refractory 110 should possess properties of being resistant to molten slag, molten metals, metal vapors, thermal shock and abrasion, and have high thermal conductivity and low thermal expansion. Refractory 110 may also be used in conjunction with the studs mentioned above, such that the refractory functions as a starting protective layer, which is gradually replaced in part or in total by frozen slag during reactor operation. Outlet section 102 is constructed similarly to sections 100 but in a conical shape and includes an outlet 112 for removing the products of the reaction within reactor shaft 98.

Process Description

Figure 4:
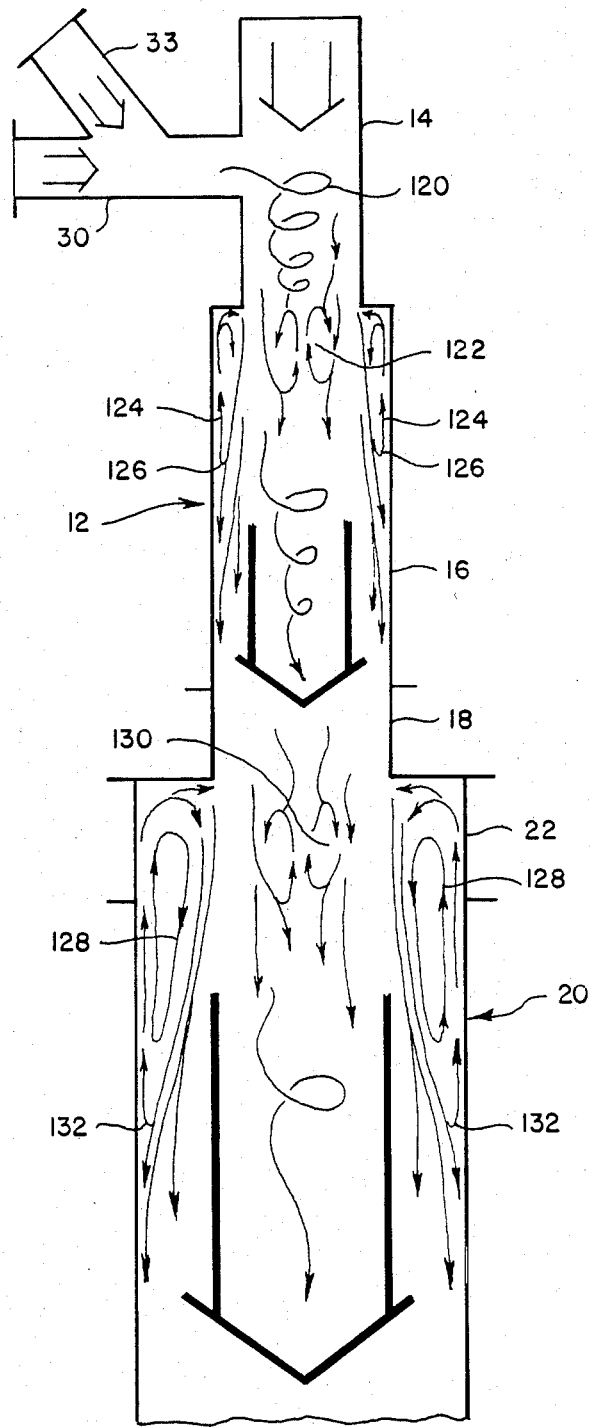
FIG. 4 is a diagrammatic view illustrating the gas dynamics believed to be operative in the process of the invention.

Based on the foregoing description of a reactor and a supporting feed system suitable for use in practicing the process of the present invention, the process steps will now be described; the description will include an explanation of the gas dynamics believed to be operative within the reactor. Referring to FIGS. 2, 3 and 4, particularly to FIG. 4, at the start-up of the process, igniter 29, using hydrocarbon fuel and oxidizing gases, produces a flame sufficient to preheat upper pilot section 14, especially side walls 74, to a radiant temperature, sufficient to cause ignition of the initial flow of fuel/air mixture as it enters upper pilot section 14. After the combustion process (reaction of the fuel/air mixture) has become self-sustaining, igniter 29 is eliminated from the circuit. Oxidizing gas is fed through pipe 33 and is introduced substantially radially into upper pilot section 14 to cause the constituents to intensively mix with some swirl therein as indicated by the arrow 120. The turbulent action is used to achieve adequate mixing of the fuel and oxiding gas in order to maintain self-sustaining ignition of the mixture. Combustion of the fuel-containing substance with the oxidizing gas commences in upper pilot section 14 and continues in the lower pilot section 16 below.

While not wishing to be bound by any particular theory of operation, it is believed that upon entering lower pilot section 16, the flow of combusting or combusted constituents develops two recirculation zones. One relatively weak zone is centrally located (known as primary recirculation), as represented by the arrows 122 in FIG. 4, and results from some swirling flow present in upper pilot section 14. The other, relatively strong, zone is located in an outer annular area (known as secondary recirculation), represented by the arrows 124, and arises as a consequence of the separation which occurs at the point of sudden flow expansion where the internal diameter of lower pilot section 16 is sufficiently greater than the internal diameter of upper pilot section 14. These secondary recirculation zones, characterized by ring vortex stabilized flow, are the essence of "dumping flow" in the gas dynamnics sense and are the meaning that shall be attributed to the term "dump flow" or "dump action" herein. These recirculation zones have been found to be essentially toroidal in shape and begin downstream of the sudden expansion zone at a point of fluidic (or gaseous) reattachment to the downstream sidewall as determined by a number of physical properties of the reacting mixture.

The points 126 in FIG. 4 show the relative gaseous reattachment points in lower pilot section 16. Therefore, a stable combustion zone results primarily from the dump flow of constituents into lower pilot section 16 and to a lesser extent by the swirling action established in upper pilot section 14. The combusting fuel-/oxidizing gas mixture then moves past gas injection section 18, where it experiences the "pinching" and "tripping" effects of the gas injected through pipes 90 and 92 as discussed above, to the exit of lower pilot section 16; these effects are believed to contribute also to flame stabilization within lower pilot section 16. By the time the flow of constituents reaches that exit, combustion of the fuel-containing substance is substantially complete.

The internal diameter of second stage 20 of reactor 10 is sufficiently greater than the internal diameter of lower pilot section 16 so as to cause the establishment in second stage 20 of a secondary recirculation zone for the reacting constituents. The feed material to be treated is introduced into second stage 20 through pipes 94 and 96 located in feed section 22. The injection occurs in a secondary recirculation zone, represented by arrows 128, that results from the sudden flow area increase at the interface between first and second stages 12 and 20 of reactor 10. Additional primary recirculation zones represented by the arrows 130 may exist inside the central core of flow due to residual swirl from the upper pilot. Points 132 show the relative gaseous reattachment points in second stage 20. Therefore, these phenomena define a dynamically stable reaction zone believed to exist within second stage 20.

The foregoing explanation of the gas dynamics believed to be operative within reactor 10 is based in part on well-established gas dynamics principles and in part on actual observations, including the refractory wear patterns within reactor 10, and solid particles flowing upwardly along reactor walls countercurrent to the prevailing downward flow in the reactor.

The reacting materials then proceed to the bottom of reactor shaft 98 where they exit at outlet 112 to enter the separation stages depicted in FIG. 1.

EXAMPLES

The method and apparatus of the present invention will now be more specifically described in terms of the following nonlimiting examples. Referring to FIG. 3, reactor 10 can, for example, have the following characteristics and dimensions

| PILOT PLANT DIMENSIONS | | |
|---|---|---|
| Section | Diameter (ID) | Length |
| First stage (12) | — | 3' 11" |
| Upper pilot section (14) | 6" | 1' 3" |
| Lower pilot section (16) | 10" | 2' 1" |
| Gas injection section (18) | 10" | 7" |
| Second stage (20) | — | 10' 9" |
| Feed injection (22) | 18" | 9" |
| Reactor Sections (100) - 3 | 18" | 3' ea - 9' total |
| Transition (102) | 18" × 10" conical, tapered | 12" |

Further, in reactor 10, the stepheight (which is the radial distance between the interior wall of an upstream cylindrical flow passage and the interior wall of an adjacent downstream flow passage) between upper pilot section 14 and lower pilot section 16 was two inches and between lower pilot section 16 and reactor section 24 was four inches.

EXAMPLE 1

To more fully illustrate the process of the invention, the following pilot plant example is presented for the treatment of lead blast furnace slag to recover lead and zinc values in an oxidic product and produce a nontoxic final slag with respect to the environment. Feed compositions are presented in Table I.

Fine coal is injected with air into the upper pilot section 14 where it mixes and ignites with a stream of oxygen enriched air (or an $O_2$, $N_2$ mixture). The hot fuel-rich reaction mixture continues to react in the lower pilot section 16 and more oxygenen-riched air is injected at the gas injection section 18. At the top of second stage 20, two separate streams of raw pulverized blast furnace slag are injected with nitrogen (or alternatively with air) at feed section 22 through diametrically opposed tubes into the hot, fuel-rich reaction mixture to throughly mix, react and fuse. The zinc and lead are reduced from the slag to metal vapors, at temperatures of 1300°–2000° C. (2375°–3630° F.) and the remaining gangue and coal ash fuse to molten slag. Solid and gaseous feeds are controlled to give the desired gas composition and temperature measured at the reactor exit of $CO/CO_2 = 0.6$ and temperature 1410° C. (2570° F.), respectively. Compositions of the resulting products are shown in Table II.

TABLE I

| Feed Composition | | | | | |
|---|---|---|---|---|---|
| Raw Pulverized Slag (% wt) | | | Pulverized Coal (% wt) | | |
| | | | Ultimate | | Proximate |
| Pb | 2.0 | Si | 12.4 | $C_t$ | 78.0 | V.M. | 38.1 |
| Zn | 10.9 | Ca | 7.7 | $H_2O$ | 2.1 | $C_f$ | 52.7 |
| C | 0.1 | Mg | 3.6 | $H_2$ | 5.0 | Btu/lbs | 13,875 |
| S | 1.8 | Al | 2.4 | $N_2$ | 1.5 | (as received) |
| Fe | 26.3 | | | S | 1.1 | |
| Size 73% (−)200 Mesh | | | | Ash | 7.0 | |
| | | | | $O_2$ (by diff) | 5.3 | |
| | | | | Size 72% (−)200 mesh | | |

TABLE II

| Feed Rates | | |
|---|---|---|
| Coal | 15.2 lb/min | 0.46 tph |
| Lead Blast Furnace Slag | 43.9 lb/min | 1.3 tph |
| Total Oxidant | | 629 scfm (44.8% $O_2$) |
| Coal Injection | | 61 scfm (air) |
| Upper Pilot Oxidant | | 339 scfm (73.2% $O_2$) |
| Gas Inj. Cham. Ox. | | 129 scfm (16.3% $O_2$) |
| Slag Injection | | 100 scfm (100% $N_2$) |
| Reactor Conditions | | |
| Temperature | 1410° C. (2570° F.) | |
| $CO/CO_2$ Ratio | 0.59 | |
| Reactor Off-gas Composition (dry vol. %) | | |
| CO | 15.0 | $N_2$ | 54.5 |
| $CO_2$ | 25.5 | $O_2$ | 0.3 |
| $H_2$ | 4.6 | | |
| Carbon Efficiency 81% | | |
| Product Rates | | |
| Crude Oxide | 8.5 lb/min | 0.26 tph |
| Product Slag | 39 lb/min | 1.2 tph |

| Product Compositions (wt %) | | Recoveries (%) | |
|---|---|---|---|
| | Crude Oxide | Slag* | To Oxide | To Slag |
| Zn | 45.6 | 2.4 | 80.4 | 19.6 |
| Pb | 9.3 | 0.11 | 95.3 | 4.7 |

*Slag passed EPA solid waste toxicity test as nonhazardous

EXAMPLE 2

A further illustration of the process of the present invention may be found in the treatment in the pilot plant described above of fume generated during steel-making processes carried out in an Electric Arc Furnace (EAF). In this treatment procedure, zinc and lead values are recovered in a crude oxide product and an environmentally nonhazardous slag is produced. Feed compositions are presented below in Table III.

Pulverized coke breeze is injected with air into the upper pilot section 14, where it mixes and ignites with a stream of oxygen enriched air (or an $N_2$, $O_2$ mixture).

The hot fuel-rich reaction mixture continues to react in the lower pilot section 16, and more oxygen-enriched air is injected at the gas injection section 18. At the top of the second stage 20, two separate streams of EAF dust are injected with air (or $N_2$) at the feed section 22 through diametrically opposed tubes into the hot, fuel-rich reaction mixture, to thoroughly mix, react and fuse. The zinc and lead are reduced from the EAF dust to metal vapors, at a temperature of from 1300° to 2000° C. (2375°–3630° F.), and the remaining gangue and coal ash fuse to molten slag. Solid and gaseous feeds are controlled to produce the desired gas composition at the reactor exit of $CO/CO_2=0.27$, and temperature of 1680° C. (3060° F.), respectively. Feed and product rates, compositions and recoveries to products are presented in Table IV.

TABLE III

| Feed Composition | | | |
|---|---|---|---|
| EAF Dust | | Coke Breeze | |
| Zn | 12.2% | $C_f$ | 83.2% |
| Pb | 1.64% | VM | 3.0% |
| Cd | .097% | $H_2O$ | 0.4% |
| Fe | 39.0% | Ash | 11.8% |
| Si | 1.74% | Btu/lb | 11,900 |
| Al | 0.40% | S | 1.0 |
| Cr | 0.76% | Sizing 70% −200 mesh | |
| Ca | 3.64% | | |
| Sizing 100% −⅛" | | | |

TABLE IV

| Feed Rates | | |
|---|---|---|
| Coke Breeze | 20.5 lb/min | 0.62 tph |
| EAF Dust | 53.3 lb/min | 1.6 tph |
| Total Oxidant | | 776 scfm (54.3% $O_2$) |
| Coke Injection | | 55 scfm (air) |
| Upper Pilot Oxidant | | 287 scfm (67.2% $O_2$) |
| Gas Inj. Cham. Ox. | | 370 scfm (54.7% $O_2$) |
| Dust Injection | | 64 scfm (air) |
| Reactor Conditions | | |
| Temperature | 1680° C. (3060° F.) | |
| $CO/CO_2$ Ratio | 0.27 | |
| Reactor Off-gas (dry vol. %) | | |
| CO | 11.6 | $N_2$ 41.7 |
| $CO_2$ | 42.5 | $O_2$ 0.3 |
| $H_2$ | 3.5 | |
| Carbon Efficiency 97% | | |
| Product Rates | | |
| Crude Oxide | 14 lb/min | 0.42 tph |
| Slag | 43 lb/min | 1.7 tph |

| Product Compositions (wt %) | | | Recoveries (%) | |
|---|---|---|---|---|
| | Crude Oxide | Slag* | To Oxide | To Slag* |
| Zn | 35.4 | 2.4 | 80 | |
| Pb | 6.5 | 0.3 | 86 | |
| Cd | 0.79 | .005 | 97 | |
| Fe | 7.5 | 43.9 | | 94 |
| Si | 1.2 | 3.1 | | 90 |
| Al | 0.53 | 3.9 | | 95 |
| Cr | 0.17 | 1.3 | | 93 |
| Ca | 0.92 | 4.1 | | 93 |

*Slag passed EPA solid waste toxicity test as nonhazardous

EXAMPLE 3

A third pilot plant example is presented for the treatment of the combined feeds of low-grade zinc secondaries and lead blast furnace slag. Zinc and lead values are recovered in a crude oxide by the process of the present invention; the product can be more readily fed to zinc production processes in preference to the low-grade secondaries. The lead blast furnace slag acts as a flux for the high-melting point slag constituents in the secondaries, and eliminates it as a potentially hazardous solid waste. Feed compositions are presented in Table V below.

Fine coal is injected with air into the upper pilot section 14, where it mixes and ignites with a stream of oxygen-enriched air (or $O_2$, $N_2$ mixture). The hot, fuel-rich reaction mixture continues to react in the lower pilot section 16 and more oxygen-enriched air is injected in the gas injection section 18. At the top of the second stage 20, separate streams of low-grade zinc secondaries and lead blast furnace slag (both pulverized) are injected with nitrogen (or with air) at the feed injection section 22 through diametrically-opposed tubes into the hot, fuel-rich reaction mixture to thoroughly mix, react and fuse. The zinc and lead are reduced from the feed materials to metal vapors, at temperatures from 1300° to 2000° C. (2375°–3630° F.), and the remaining gangue and coal ash fuse to molten slag. Solid and gaseous feeds are controlled to achieve the desired gas composition and temperature measured at the reactor exit of $CO/CO_2=0.19$ and temperature 1620° C. (2950° F.), respectively. Feed and product rates and compositions and recoveries to products are presented in Table VI.

TABLE V

| Feed Compositions (wt %) | | | | | |
|---|---|---|---|---|---|
| Low-Grade Zinc Secondaries | | Lead Blast Furnace Slag | | Coal | |
| Zn | 36.4 | Zn | 10.9 | $C_f$ | 78.0 |
| Pb | 2.03 | Pb | 2.0 | VM | 38.1 |
| Cd | .014 | Fe | 26.3 | $H_2O$ | 2.1 |
| Fe | 6.6 | Si | 12.4 | Ash | 7.0 |
| Si | 3.4 | Al | 2.4 | S | 1.1 |
| Al | 9.6 | Ca | 7.7 | Btu/lb | 13,875 |
| Ca | 0.59 | Mg | 3.6 | Sizing 70% −200 mesh | |
| Mg | 0.39 | C | 0.1 | | |
| C | 4.57 | S | 1.8 | | |
| S | 0.18 | Sizing 70% −200 mesh | | | |
| Sizing 70% −200 mesh | | | | | |

TABLE VI

| Feed Rates | | |
|---|---|---|
| Coal | 14 lb/min | 0.42 tph |
| Low-Grade Zinc Secondaries | 25.2 lb/min | 0.76 tph |
| Lead Blast Furnace Slag | 25.4 lb/min | 0.76 tph |
| Total Oxidant | | 589 scfm (57.8% $O_2$) |
| Coal Injection | | 60 scfm (air) |
| Upper Pilot Oxidant | | 346 scfm (82.7% $O_2$) |
| Gas. Inj. Cham. Ox. | | 84 scfm (50% $O_2$) |
| Secs/Slag Injection | | 99 scfm (100% $N_2$) |
| Reactor Conditions | | |
| Temperature | 1620° C. (2950° F.) | |
| $CO/CO_2$ Ratio | 0.19 | |
| Reactor Off-gas Composition (dry vol. %) | | |
| CO | 8.2 | $N_2$ 43.8 |
| $CO_2$ | 43.8 | $O_2$ 0.3 |
| $H_2$ | 3.8 | |
| Carbon Efficiency 90% | | |
| Product Rates | | |
| Crude Oxide | 19 lb/min | 0.57 tph |
| Product Slag | 35 lb/min | 1.05 tph |

| Product Compositions (wt %) | | | Recoveries (%) | |
|---|---|---|---|---|
| | Crude Oxide | Slag | To Oxide | To Slag |
| Zn | 62.8 | 3.9 | 89 | |
| Pb | 5.7 | 0.15 | 95 | |
| Fe | 1.8 | 24.6 | | 96 |
| Si | 1.3 | 11.4 | | 94 |
| Al | 1.4 | 8.55 | | 94 |

EXAMPLE 4

A fourth pilot plant example is presented for the treatment of an electrolytic zinc plant purification residue rich in cobalt, nickle and copper. The process of the present invention recovers a saleable Co-Ni-Cu alloy by eliminating zinc, lead and cadmium, which in turn are recovered as a crude oxide. Feed compositions are presented in Table VII.

Fine coal is injected with air into the upper pilot section 14, where it mixes and ignites with a stream of oxygen-enriched air (or an $O_2$, $N_2$ mixture). The hot, fuel-rich mixture continues to react in the lower pilot section 16 and more oxygen-enriched air is injected at the gas injection section 18. At the top of the second stage 20, two separate streams of pulverized Co-Ni-Cu residues are injected with nitrogen (or with air) at feed injection section 22 through diametrically opposed tubes into the hot, fuel-rich reaction mixture to thoroughly mix, react and fuse. The zinc, lead and cadmium are reduced from the residues to metal vapors, at temperatures from 1300°-2000° C. (2375°-3630° F.), and the remaining Co-Ni-Cu alloy with a small amount of coal ash fuse into the molten product alloy stream. Solid and gaseous feed are controlled to achieve the desired gas composition and temperature at the exit of the reactor of $CO/CO_2=0.26$ and temperature=1690° C. (3075° F.), respectivelky. Feed and product rates, and the composition and recoveries to products are presented in Table VII.

TABLE VII

| Feed Composition (wt %) | | | |
|---|---|---|---|
| Co—Ni—Cu Residues | | Coal | |
| Co | 6.2 | $C_f$ | 78.0 |
| Ni | 4.4 | VM | 38.1 |
| Cu | 10.1 | $H_2O$ | 2.1 |
| Zn | 17.5 | Ash | 7.0 |
| Pb | 15.6 | S | 1.1 |
| Cd | 4.4 | Btu/lb | 13,900 |
| Sizing 100% −⅛" | | Sizing 70% −200 mesh | |

TABLE VIII

| Feed Rates | | |
|---|---|---|
| Coal | 18.5 lb/min | 0.56 tph |
| Residues | 40 lb/min | 1.20 tph |
| Total Oxidant | | 672 scfm (57.7% $O_2$) |
| Coal Injection | | 64 scfm (air) |
| Upper Pilot Oxidant | | 413 scfm (73% $O_2$) |
| Gas Inj. Cham. Ox. | | 64 scfm (68% $O_2$) |
| Residues Injection | | 122 scfm (100% $N_2$) |
| Reactor Conditions | | |
| Temperature | | 1690° C. (3075° F.) |
| $CO/CO_2$ Ratio | | 0.26 |
| Reactor Off-gas Composition (dry vol. %) | | |
| CO | 10.2 | $N_2$ 59.4 |
| $CO_2$ | 47.5 | $O_2$ 0.3 |
| $H_2$ | 2.8 | |
| Product Rates | | |
| Co—Ni—Cu Alloy | 13.6 lb/min | 0.41 tph |
| Crude Oxide | 21.5 lb/min | 0.65 tph |

| Product Compositions (wt %) | | | Recoveries (%) | |
|---|---|---|---|---|
| | Alloy | Oxide | To Alloy | To Oxide |
| Co | 13.7 | 1.0 | 90 | |
| Ni | 12.3 | 0.73 | 91 | |
| Cu | 24.4 | 3.2 | 83 | |
| Zn | 3.2 | 37.0 | | 94 |
| Pb | 2.2 | 29.4 | | 95 |
| Cd | .008 | 7.9 | | 99 |

SCALE-UP/SIZING

The sizing of reactor sections is primarily governed by the residence time required by feed particles in each section to achieve the desired degree of completion of chemical reactions and fusion of gangue. A secondary but significant factor is the role of recirculation, which occurs according to known gas dynamics principles, as hot gases expand from the one section to the next adjacent section down the reactor. The recirculation effects the reactor's efficiency to substantially complete the reactions in desired time; therefore three general criteria for scale-up would be:

(a) providing sufficient residence time in the reactor to cause the feed particles to achieve the desired degree of completion of chemical reactions and fusion of gangue by adjusting diameter/cross section and possibly length in proportion to the increase in throughput;

(b) providing for sufficient recirculation in the reactor (for example, by keeping the same stepheight to upstream section diameter ratio); and (c) providing minimum length to assure gaseous reattachment of recirculation zones as estimated by gas dynamic theory to be at least five times the stepheight between sections.

Residence time has been determined by measurement of reactor gas temperature, calculating gas volumes based upon analysis of reactor gases and then calculating reactor velocity. It can also be assumed that equilibrium thermochemistry can be used to estimate completeness of reactions and reactor gas volumes and temperatures. The length of the reactor can then be determined by calculating reactor gas velocity and estimating residence time needed to complete reactions to the desired degree.

One example of scale-up which can be presented is for a subpilot to pilot scale reactor, which roughly increased the reactor throughput two to three times by increasing the diameter by 50%:

| | Subpilot | Pilot | Pilot/Subpilot Ratio |
|---|---|---|---|
| Upper pilot diameter | 3" | 4" | 1.33 |
| Upper pilot length | 9" | 15" | 1.67 |
| Lower pilot diameter | 6" | 10" | 1.67 |
| Lower pilot length | 28" | 32" | 1.14 |
| Reactor diameter | 12" | 18" | 1.50 |
| Reactor length | 7' | 9' | 1.29 |
| Reactor cross-sectional area | 0.79 ft² | 1.77 ft² | 2.25 |
| Reactor feed throughput | 13 lb/min | 45 lb/min | 3.5 |
| Pilot residence time | 18 msec | 21 msec | 1.2 |
| Reactor residence time | 200 msec | 200 msec | 1.0 |
| Reactor velocity | 35 fps | 45 fps | 1.29 |
| Upper pilot/lower pilot stepheight | 1.5" | 3" | 2.0 |
| Lower pilot/reactor stepheight | 3" | 4" | 1.33 |
| Stepheight to reactor diameter % | 25 | 22 | 0.88 |

What is claimed is:

1. A process for pyrometallurgically treating finely divided ores, concentrates, residues, slags, and like metal-bearing materials, comprising the step of:
   providing within a first vertically-extending chamber hot fuel-rich reaction gases;
   passing said hot fuel-rich reaction gases by dump flow into a second vertically-extending chamber;

introducing into said second chamber the finely divided materials to be treated; and reacting said finely divided materials with said hot fuel-rich reaction gases.

2. A process as recited in claim 1 wherein said hot fuel-rich reaction gases are provided by:

forming a reaction mixture of a fuel-containing substance and an oxidizing gas within said first chamber; and substantially reacting said mixture within said first chamber under fuel-rich conditions.

3. A process as recited in claim 1 wherein:

said dump flow of hot fuel-rich reaction gases passing into said second chamber is produced by providing a zone of sudden expansion in the flow passage between said first and second chambers.

4. A process as recited in claim 1 wherein:

said finely divided materials to be treated are introduced inwardly into said second chamber.

5. A process as recited in claim 2 comprising the further step of:

providing at least one zone of dump flow within said first chamber.

6. A process as recited in claim 5 wherein:

said zone of dump flow within said first chamber is produced by providing a zone of sudden expansion in the flow passage of said first chamber.

7. A process as recited in claim 6 which comprises the further step of:

introducing oxidizing gas into said first chamber downstream of said zone of dump flow therein.

8. A process as recited in claim 2 wherein:

said reaction mixture is formed within said first chamber by introducing said fuel-containing substance downwardly and introducing said oxidizing gas substantially radially to produce a turbulent mixing action of said mixture.

9. A process as recited in claim 2 wherein:

said reaction mixture is formed within said first chamber by introducing said fuel-containing substance substantially radially and introducing said oxidizing gas downwardly to produce a turbulent mixing action of said mixture.

10. A process as recited in claim 2 wherein:

said fuel-containing substance is ignited upon its introduction into said first chamber.

11. A process for pyrometallurgically treating finely divided ores, concentrates, residues, slags, and like metal-bearing materials, comprising the steps of:

forming a reaction mixture of a fuel-containing substance and an oxidizing gas within a first vertically extending chamber;

substantially reacting said mixture within said first chamber to produce hot fuel-rich reaction products;

providing within said first chamber at least one zone of dump flow;

introducing oxidizing gas into said first chamber downstream of said zone of dump flow;

passing said hot fuel-rich reaction products by dump flow into a second vertically extending chamber;

introducing into said second chamber the said finely divided materials to be treated; and reacting said finely divided materials with said hot fuelrich reaction products.

* * * * *

UNITED STATES PATENT AND TRADEMARK OFFICE
CERTIFICATE OF CORRECTION

PATENT NO. : 4,654,077
DATED : March 31, 1987
INVENTOR(S) : John F. Pusateri et al.

It is certified that error appears in the above—identified patent and that said Letters Patent is hereby corrected as shown below:

Column 7, line 9, delete "Of" and substitute therefor --of--;

Column 10, line 2, delete "oxygenen-riched" and substitute therefor --oxygen-enriched--;

Column 13, line 28, delete "respectivelky" and substitute therefor --respectively--;

Column 13, line 30, delete "VII" and substitute therefor --VIII--;

Column 16, line 33, delete "fuelrich" and substitute therefor --fuel-rich--.

Signed and Sealed this

Twenty-seventh Day of October, 1987

Attest:

DONALD J. QUIGG

Attesting Officer

Commissioner of Patents and Trademarks

REEXAMINATION CERTIFICATE (1978th)
United States Patent [19]
Pusateri et al.

[11] B1 4,654,077
[45] Certificate Issued    Apr. 20, 1993

[54] METHOD FOR THE PYROMETTALLURGICAL TREATMENT OF FINELY DIVIDED MATERIALS

[75] Inventors: John F. Pusateri, Beaverton, Pa.; Thomas E. Kidd, Tullahoma; Glen R. Lazalier, Hillsboro, both of Tenn.

[73] Assignee: Manufacturers Hanover Trust Company

Reexamination Request:
No. 90/002,457, Oct. 1, 1991

Reexamination Certificate for:
Patent No.: 4,654,077
Issued: Mar. 31, 1987
Appl. No.: 799,538
Filed: Nov. 19, 1985

[51] Int. Cl.$^5$ .................................................. C22B 5/02
[52] U.S. Cl. .................................... 423/619; 75/585; 266/200; 423/623
[58] Field of Search ............... 423/619, 623; 266/200; 75/585

[56] References Cited

U.S. PATENT DOCUMENTS

| | | | |
|---|---|---|---|
| 2,894,831 | 7/1959 | Old | 75/10.38 |
| 3,271,134 | 9/1966 | Derham | 75/659 |
| 3,607,224 | 9/1971 | Blaskowski | 75/453 |
| 3,787,556 | 1/1974 | Piccolo et al. | 423/77 |
| 3,915,692 | 10/1975 | Herbert et al. | 423/48 |
| 4,362,561 | 12/1982 | Weigel et al. | 75/643 |

OTHER PUBLICATIONS

Turbulent Shear Flows I, Selected Papers from the First International Shear Flows, The Pennsylvania State University, University Park, PA, USA, Apr. 18–20, 1977, Editors: F. Durst et al. Springer-Verlag Berlin Heidelberg New York 1979.

Combustion Aerodynamics, J. M. Beer et al., Halsted Press Division John Wiley & Sons, Inc., New York, 1972.

Bryk et al., "Flash Smelting of Lead Concentrates," J. of Metals, Dec. 1966, 1298–1302.

Melcher et al. "The KIVCET Cyclone Smelting Process for Impure Copper Concentrates", J. of Metals, Jul. 1976, 4–8.

Elvander et al. "The BOLIDEN INRED Process for Smelting of Fine-Grained Ion Oxides and Concentrates," Third Iron & Steel Cong. Proc. Apr. 1978, Chicago, IL., 195–200.

Bergtsson et al. "The Chemistry of the ELRED Process," I & SM Oct. 1981, 30–34.

Chaudhuri et al. "Comparative View On The Metallurgy of the KIVCET-CS and Other Direct Lead Smelting Processes," CIM Bulletin, Nov. 1978, 126–130.

*Primary Examiner*—Peter D. Rosenberg

[57] ABSTRACT

Process and apparatus for pyrometallurgically treating finely divided ores, concentrates, residues, slags and like materials. The process utilizes a reactor having two co-axially extending, vertical reaction chambers. The process comprises forming within the upper chamber of the reactor hot fuel-rich reaction gases; passing the hot fuel-rich reaction gases by dump flow into a second vertically extending chamber, introducing into the second chamber the finely divided materials to be treated; and reacting the finely divided materials with the hot fuel-rich reaction gases. The dump flow of hot fuel-rich reaction gases passing into the second chamber is produced by providing a zone of sudden expansion in the flow passage between the first and second chambers.

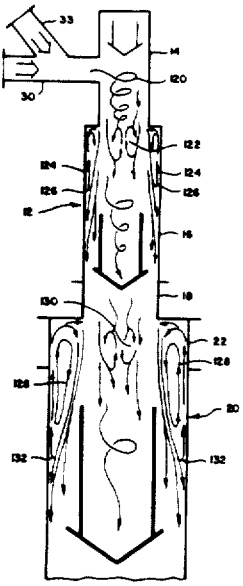

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 5–7, and 11 are determined to be patentable as amended.

Claims 2, 4 and 8–10, dependent on an amended claim, are determined to be patentable.

1. A process for pyrometallurgically treating finely divided ores, concentrates, residues, slags, and like metal-bearing materials, comprising the step of:
   providing within a first vertically-extending chamber hot fuel-rich reaction gases;
   passing said hot fuel-rich reaction gases by [dump] *ring vortex stabilized* flow into a second vertically-extending chamber;
   introducing into said second chamber the finely divided materials to be treated; and
   reacting said finely divided materials with said hot fuel-rich reaction gases.

3. A process as recited in claim 1 wherein:
   said [dump] *ring vortex stabilized* flow of hot fuel-rich reaction gases passing into said second chamber is produced by providing a zone of sudden expansion in the flow passage between said first and second chambers.

5. A process as recited in claim 2 comprising the further step of:
   providing at least one zone of [dump] *ring vortex stabilized* flow within said first chamber.

6. A process as recited in claim 5 wherein:
   said zone of [dump] *ring vortex stabilized* flow within said first chamber is produced by providing a zone of sudden expansion in the flow passage of said first chamber.

7. A process as recited in claim 6 which comprises the further step of:
   introducing oxidizing gas into said first chamber downstream of said zone of [dump] *ring vortex stabilized* flow therein.

11. A process for pyrometallurgically treating finely divided ores, concentrates, residues, slags, and like metal-bearing materials, comprising the steps of:
   forming a reaction mixture of a fuel-containing substance and an oxidizing gas within a first vertically extending chamber;
   substantially reacting said mixture within said first chamber to produce hot fuel-rich reaction products;
   providing within said first chamber at least one zone of [dump] *ring vortex stabilized* flow;
   introducing oxidizing gas into said first chamber downstream of said zone of [dump] *ring vortex stabilized* flow;
   passing said hot fuel-rich reaction products by [dump] *ring vortex stabilized* flow into a second vertically extending chamber;
   introducing into said second chamber the said finely divided materials to be treated; and
   reacting said finely divided materials with said hot fuelrich reaction products.

* * * * *